(12) United States Patent
Armstrong et al.

(10) Patent No.: US 7,464,209 B2
(45) Date of Patent: *Dec. 9, 2008

(54) CONTROLLING RESOURCE TRANSFERS USING LOCKS IN A LOGICALLY PARTITIONED COMPUTER SYSTEM

(75) Inventors: Troy David Armstrong, Rochester, MN (US); William Joseph Armstrong, Rochester, MN (US); Curtis Shannon Eide, Rochester, MN (US); Gergory Michael Nordstrom, Pine Island, MN (US)

(73) Assignee: International Business Machines Corporation, Armonk, NY (US)

( * ) Notice: Subject to any disclaimer, the term of this patent is extended or adjusted under 35 U.S.C. 154(b) by 213 days.

This patent is subject to a terminal disclaimer.

(21) Appl. No.: 11/374,883

(22) Filed: Mar. 14, 2006

(65) Prior Publication Data

US 2006/0168381 A1    Jul. 27, 2006

Related U.S. Application Data

(63) Continuation of application No. 10/388,350, filed on Mar. 13, 2003, now Pat. No. 7,073,002.

(51) Int. Cl.
*G06F 12/00* (2006.01)
(52) U.S. Cl. .................... 710/200; 710/240
(58) Field of Classification Search ........... 710/200, 710/240; 711/200, 202, 203; 709/226, 216
See application file for complete search history.

(56) References Cited

U.S. PATENT DOCUMENTS

| | | | |
|---|---|---|---|
| 5,297,262 A | * | 3/1994 | Cox et al. ............ 710/36 |
| 5,371,867 A | | 12/1994 | George et al. |
| 5,414,851 A | * | 5/1995 | Brice et al. ............ 718/104 |
| 5,655,146 A | | 8/1997 | Baum et al. |
| 5,708,790 A | | 1/1998 | White et al. |
| 5,721,858 A | | 2/1998 | White et al. |
| 6,023,736 A | * | 2/2000 | Lambeth et al. ......... 710/10 |

(Continued)

FOREIGN PATENT DOCUMENTS

EP    0 917 056 A2    5/1999

OTHER PUBLICATIONS

Logical Partition Security in the IBM eserver pSeries 690, undated.*

(Continued)

*Primary Examiner*—Khanh Dang
(74) *Attorney, Agent, or Firm*—Martin & Associates, LLC; Derek P. Martin

(57) ABSTRACT

A resource and partition manager of the preferred embodiments includes a lock mechanism that operates on a plurality of locks that control access to individual PCI adaptor slots. The resource and partition manager uses the lock mechanism to obtain a lock on an PCI adaptor slot when transferring control of the PCI adaptor slot to a logical partition that is powering on and when removing the PCI adaptor from a logical partition that is powering off. The resource and partition manager uses the lock mechanism to remove control of an PCI adaptor slot from, or return control to, an operating logical partition in order to facilitate hardware service operations on that PCI adaptor slot or on the physical enclosure in which it is contained.

1 Claim, 8 Drawing Sheets

U.S. PATENT DOCUMENTS

| | | | |
|---|---|---|---|
| 6,247,109 B1 | 6/2001 | Kleinsorge et al. | |
| 6,279,046 B1 | 8/2001 | Armstrong et al. | |
| 6,332,180 B1 | 12/2001 | Kauffman et al. | |
| 6,381,682 B2 | 4/2002 | Noel et al. | |
| 6,542,926 B2 | 4/2003 | Zalewski et al. | |
| 6,633,916 B2 | 10/2003 | Kauffman | |
| 6,662,242 B2 * | 12/2003 | Holm et al. | 710/9 |
| 6,665,759 B2 * | 12/2003 | Dawkins et al. | 710/200 |
| 6,792,497 B1 * | 9/2004 | Gold et al. | 710/317 |
| 7,000,043 B2 * | 2/2006 | Finch | 710/104 |
| 2002/0161869 A1 | 10/2002 | Griffin et al. | |
| 2002/0161891 A1 | 10/2002 | Higuchi et al. | |
| 2003/0041090 A1 | 2/2003 | Armstrong et al. | |

OTHER PUBLICATIONS

The Effect of Virtualization on OS Interference, Eric Van Hensbergen, IBM Research, undated.*

Kenneth Mason, "Method for Interlocked Deferred Partition Reset in a Logical Partitioning Environment," International Business Machines Corporation, Research Disclosure, vol. 458, No. 152, Jun. 2002, ISSN 0374-4353.

* cited by examiner

CONTROLLING RESOURCE TRANSFERS USING LOCKS IN A LOGICALLY PARTITIONED COMPUTER SYSTEM

CROSS-REFERENCE TO RELATED APPLICATIONS

This patent application is a continuation of a U.S. Patent application of the same title filed by the same inventors, Ser. No. 10/388,350 filed on Mar. 13, 2003 now U.S. Pat. No. 7,073,002, and is related to a U.S. patent application entitled "METHOD FOR CONTROLLING RESOURCE TRANSFERS IN A LOGICALLY PARTITIONED COMPUTER SYSTEM" filed by the same inventors, Ser. No. 10/388,087, filed on Mar. 13, 2003. Both of these patent applications are incorporated herein by reference.

BACKGROUND OF THE INVENTION

1. Field of the Invention

This invention generally relates to data processing, and more specifically relates to allocation of shared resources in a computer system.

2. Background Art

Since the dawn of the computer age, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

The combination of hardware and software on a particular computer system defines a computing environment. Different hardware platforms and different operating systems thus provide different computing environments. In recent years, engineers have recognized that it is possible to provide different computing environments on the same physical computer system by logically partitioning the computer system resources to different computing environments. The iSeries computer system developed by IBM is an example of a computer system that supports logical partitioning. If logical partitioning on an iSeries computer system is desired, resource and partition manager code (referred to as a "hypervisor" in iSeries terminology) is installed that allows defining different computing environments on the same platform. Once the resource and partition manager is installed, logical partitions may be created that define different computing environments. The resource and partition manager manages the logical partitions to assure that they can share needed resources in the computer system while maintaining the separate computing environments defined by the logical partitions.

A computer system that includes multiple logical partitions typically shares resources between the logical partitions. For example, a computer system with two logical partitions could be defined that allocates 50% of the CPU to each partition, that allocates 33% of the memory to the first partition and 67% of the memory to the second partition, and that allocates two different I/O slots to the two logical partitions, one per partition. Once logical partitions are defined and shared resources are allocated to the logical partitions, each logical partition acts as a separate computer system. Thus, in the example above that has a single computer system with two logical partitions, the two logical partitions will appear for all practical purposes to be two separate and distinct computer systems.

One problem with known logically partitioned computer systems occurs when hardware resources need to be transferred between logical partitions. For example, if a PCI slot in a first logical partition needs to be transferred to a second logical partition, the PCI slot must first be removed from the first logical partition, and the PCI slot can then be allocated to the second logical partition. Note, however, that once the PCI slot has been removed from the first logical partition, in the prior art two logical partitions might compete for control of the PCI slot at the same time. In addition, when a PCI slot is allocated to a different logical partition, it may contain data from the previous logical partition that could be compromised under certain circumstances. Furthermore, the PCI slot may be configured in a particular state suitable for the first logical partition, which is not necessarily suitable for the second logical partition. Without a way to dynamically transfer I/O resources in a logically partitioned computer system without the drawbacks known in the art, the computer industry will continue to suffer from potentially insecure and inefficient mechanisms and methods for performing I/O resource transfers in logically partitioned computer systems.

BRIEF SUMMARY OF THE INVENTION

A resource and partition manager of the preferred embodiments includes a lock mechanism that operates on a plurality of locks that control access to individual PCI adaptor slots. The resource and partition manager uses the lock mechanism to obtain a lock on an PCI adaptor slot when transferring control of the PCI adaptor slot to a logical partition that is powering on and when removing the PCI adaptor slot from a logical partition that is powering off. The resource and partition manager uses the lock mechanism to remove control of an PCI adaptor slot from, or return control to, an operating logical partition in order to facilitate hardware service operations on that PCI adaptor slot or on the physical enclosure in which it is contained. The preferred embodiments also include methods for releasing system resources and address bindings allocated to an PCI adaptor slot when control the PCI adaptor slot is removed from a logical partition, and methods for allocating and initializing system resources when control of an PCI adaptor slot is transferred to a logical partition. In addition, the preferred embodiments include the use of the locks and related mechanisms to transfer PCI adaptor slots from the logical partitions to the resource and partition manager, and later back to the logical partitions, for the purpose of performing hardware service operations on an PCI adaptor slot or the components of a physical enclosure containing these PCI adaptor slots.

The foregoing and other features and advantages of the invention will be apparent from the following more particular description of preferred embodiments of the invention, as illustrated in the accompanying drawings.

BRIEF DESCRIPTION OF THE SEVERAL VIEWS OF THE DRAWING

The preferred embodiments of the present invention will hereinafter be described in conjunction with the appended drawings, where like designations denote like elements, and.

DETAILED DESCRIPTION OF THE INVENTION

According to preferred embodiments of the present invention, hardware resources, such as I/O slots, in a logically partitioned computer system may be allocated to a logical partition and removed from a logical partition. This allows hardware resources to be transferred in a logically partitioned computer system. Locks are defined that correspond to each hardware resource. To gain access to a hardware resource, a logical partition must acquire ownership of the lock corresponding to the hardware resource. A power on/power off mechanism assures that a hardware resource is powered off when the hardware resource is removed from a logical partition, and assures that a hardware resource is powered up when the hardware resource is allocated to a logical partition. In this manner, each logical partition is assured of seeing the hardware resource in its power-on reset state. For the specific example of an I/O slot, by cycling power to the I/O slot when it is removed from one logical partition and allocated to a different logical partition, the power on/power off mechanism assures that both data and configuration information from an I/O adapter plugged into the slot are purged when allocating the I/O slot to a different logical partition. In addition, hardware resources may be transferred temporarily from their logical partitions to the resource and partition manager in order to perform hardware service operations on a hardware resource or the components of the physical enclosure containing that hardware resource. When the hardware service is complete, the hardware resources are transferred back to their logical partitions. The locks and related mechanisms to transfer the lock between a partition and the resource and partition manager and back again facilitate such hardware service operations while the partitions continue operations.

Note that the term "hardware resource" as used in this specification denotes any whole or fractional portion of hardware in the computer system that may be independently allocated to a logical partition. Examples of hardware resources include: a physical I/O slot; a group of I/O slots in a physical enclosure; a portion of a processor; and a portion of memory. The preferred embodiments presented herein use the specific example of I/O slots as hardware resources that can be independently allocated to logical partitions. Note, however, that any hardware or portion of hardware that can be independently allocated to a logical partition falls within the scope of the term "hardware resource" as used herein.

Figure 1:
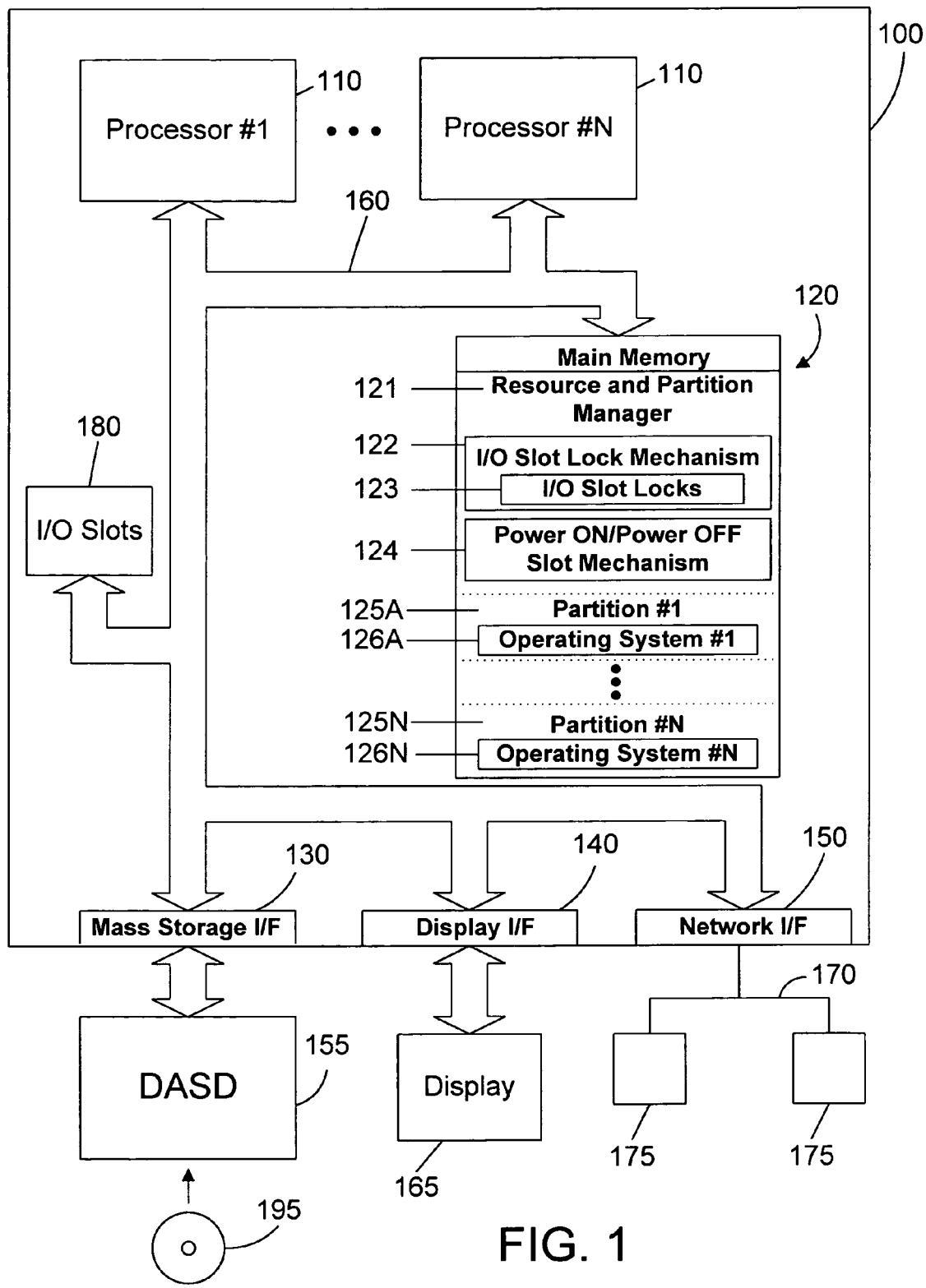
FIG. 1 is a block diagram of a computer apparatus that supports logical partitioning and I/O resource allocation in accordance with the preferred embodiments.

Referring to FIG. 1, a computer system 100 is an enhanced IBM eServer iSeries computer system, and represents one suitable type of computer system that supports logical partitioning and resource allocation in accordance with the preferred embodiments. Those skilled in the art will appreciate that the mechanisms and apparatus of the present invention apply equally to any computer system that supports logical partitions. As shown in FIG. 1, computer system 100 comprises one or more processors 110 connected to a main memory 120, a mass storage interface 130, a display interface 140, a network interface 150, and a plurality of I/O slots 180. These system components are interconnected through the use of a system bus 160. Mass storage interface 130 is used to connect mass storage devices (such as a direct access storage device 155) to computer system 100. One specific type of direct access storage device is a CD RW drive, which may read data from a CD RW 195. Note that mass storage interface 130, display interface 140, and network interface 150 may actually be implemented in adapters coupled to I/O slots 180.

Main memory 120 contains a resource and partition manager 121, an I/O slot lock mechanism 122, a power on/power off slot mechanism 124, and N logical partitions 125, shown in FIG. 1 as logical partitions 125A through 125N. Resource and partition manager 121 preferably creates these N logical partitions 125. Each logical partition preferably includes a corresponding operating system 126, shown in FIG. 1 as operating systems 126A through 126N.

I/O slot lock mechanism 122 manages access to the I/O slots 180 by defining a plurality of slot locks 123, with one slot lock 123 preferably corresponding to each I/O slot 180. When an I/O slot needs to be allocated to a logical partition, the resource and partition manager checks the corresponding slot lock to see if the I/O slot is available. If the corresponding slot lock is owned by a different logical partition, the I/O slot is under the control of that logical partition. If the corresponding slot lock is owned by the resource and partition manager or unassigned, the I/O slot may be controlled by the resource and partition manager setting the corresponding slot lock and allocating the I/O slot to the requesting logical partition. In this manner, the slot locks 123 effectively serve as semaphores that indicate whether or not the corresponding I/O slot is available.

Power on/power off slot mechanism 124 is used to assure that an I/O slot is powered down before the slot is removed from a logical partition, and to assure that a slot is powered up when the slot is allocated to a logical partition. In the prior art, an I/O slot may be removed from one logical partition and allocated to a different logical partition. However, performing this reallocation results in two possible problems. The first problem is an issue of data integrity. It is possible that data from a process running in a first logical partition may be retained in an I/O adapter plugged into an I/O slot when the I/O slot is reassigned to a different logical partition. In theory, one with sufficient skill could conceivably hack into that data from the second logical partition, which would compromise the data from the first logical partition. The second problem is that the new logical partition receiving the I/O slot does not know the current configuration of the I/O slot. In fact, because logical partitions act like different computer systems, a logical partition automatically assumes that an I/O adapter is in a power-on reset state when the I/O adapter is allocated to a logical partition. This is certainly a reasonable assumption in computer systems that are not logically partitioned. If an I/O adapter is to be physically transferred between two different computer systems, the I/O adapter will be unplugged from the first computer system and plugged into the second computer system. The result is that power is cycled on the I/O adapter during the transfer between computer systems, thereby clearing its data and placing the I/O adapter in a power on reset state. The second computer system that received the I/O adapter knows that the I/O adapter is in a power on reset state when the computer system first starts up. This assumption, however, does not hold in the case of a logically partitioned computer system. To the contrary, the prior art allows transferring I/O resources between partitions without performing any power off or power on cycle, thereby giving rise to the two problems discussed above. The power on/power off slot mechanism 124 solves this problem by assuring that power is always cycled on an I/O slot when the slot is removed from one logical partition and allocated to a different logical partition, and this is possible with disruption to operations affecting only that I/O slot and no others that may share the same physical enclosure. In this manner, each logical partition can correctly assume that an I/O adapter is in its power-on reset state when the logical partition first boots up, or when an active logical partition receives control of an I/O adapter.

Operating system 126 is a multitasking operating system, such as OS/400, AIX, or Linux; however, those skilled in the art will appreciate that the spirit and scope of the present invention is not limited to any one operating system. Any suitable operating system can be used. Operating system 126 is a sophisticated program that contains low-level code to manage the resources of computer system 100. Some of these resources are processor 110, main memory 120, mass storage interface 130, display interface 140, network interface 150, system bus 160, and I/O slots 180. The operating system 126 in each partition may be the same as the operating system in other partitions, or may be a completely different operating system. Thus, one partition can run the OS/400 operating system, while a different partition can run another instance of OS/400, possibly a different release, or with different environment settings (e.g., time zone). The operating systems in the logical partitions could even be different than OS/400, provided it is compatible with the hardware (such as AIX or Linux). In this manner the logical partitions can provide completely different computing environments on the same physical computer system.

The partitions 125A-125N are shown in FIG. 1 to reside within the main memory 120. However, one skilled in the art will recognize that a partition is a logical construct that includes resources other than memory. A logical partition typically specifies a portion of memory, along with an assignment of processor capacity and other system resources, such as I/O slots 180. Thus, one partition could be defined to include two processors and a portion of memory 120, along with one or more I/O processors that can provide the functions of mass storage interface 130, display interface 140, network interface 150, or interfaces to I/O devices plugged into I/O slots 180. Another partition could then be defined to include three other processors, a different portion of memory 120, and one or more I/O processors. The partitions are shown in FIG. 1 to symbolically represent logical partitions, which would include system resources outside of memory 120 within computer system 100. Note also that the resource and partition manager 121, the I/O slot lock mechanism 122, and the power on/power off slot mechanism 124 preferably reside in memory and hardware separate from the partitions and are facilities and mechanisms that are not directly available to the partitions. In the alternative, I/O slot lock mechanism 122 and power on/power off slot mechanism 124 could reside in any of the defined partitions in the computer system 100, or even on a computer system 175 coupled to computer system 100 via network 170.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while resource and partition manager 121 and the partitions 125A-125N are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up the resource and partition manager 121, which initializes the operating systems in the logical partitions.

Although computer system 100 is shown to contain only a single system bus, those skilled in the art will appreciate that the present invention may be practiced using a computer system that has multiple buses. In addition, the I/O interfaces that are used in the preferred embodiment each may include separate, fully programmed microprocessors that are used to off-load compute-intensive processing from processor 110, as in iSeries input/output processors, or may be simple industry standard I/O adapters (IOAs).

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer readable signal bearing media used to actually carry out the distribution. Examples of suitable signal bearing media include: recordable type media such as floppy disks and CD RW (e.g., 195 of FIG. 1), and transmission type media such as digital and analog communications links.

Figure 2:
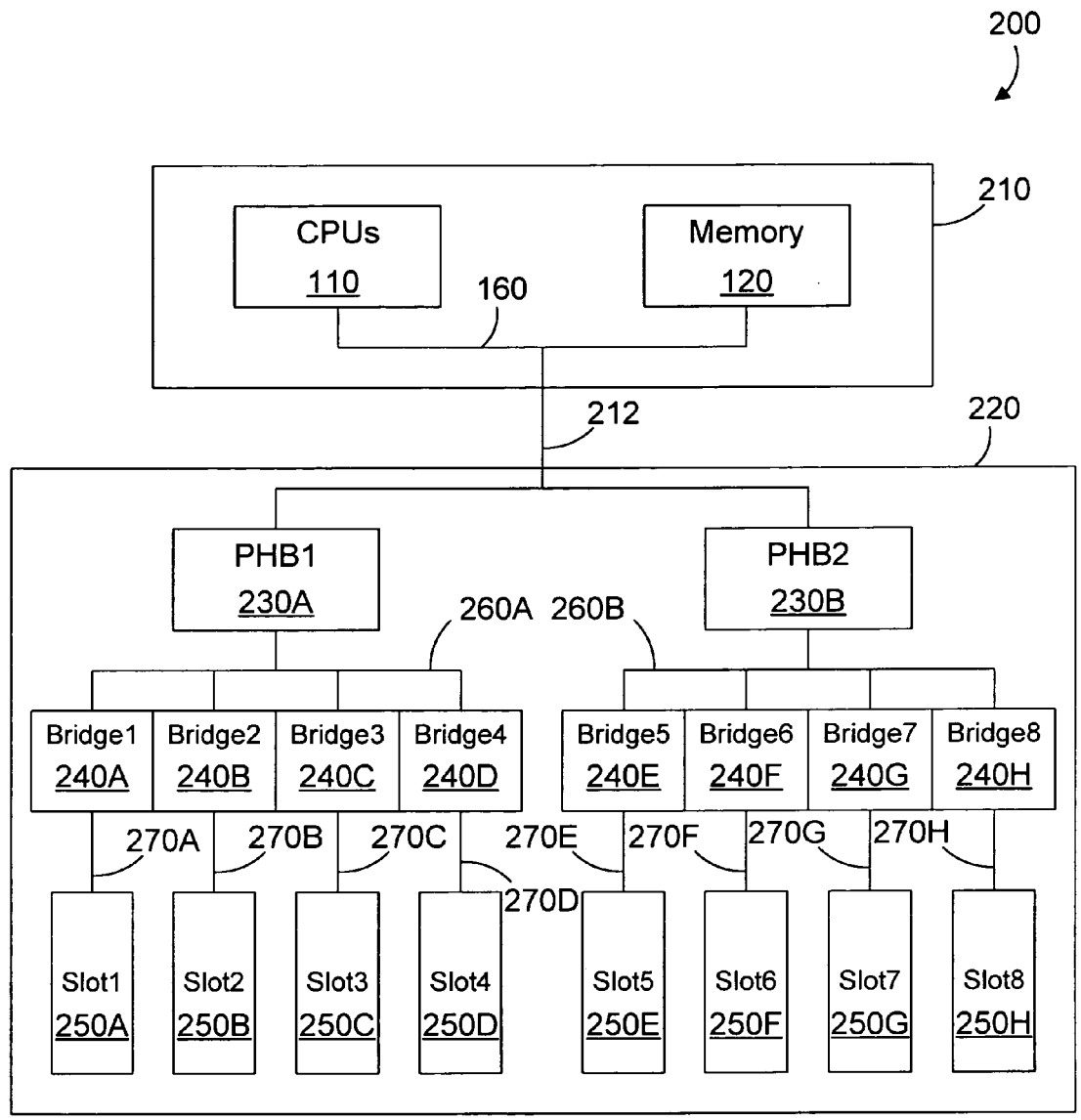
FIG. 2 is a more detailed block diagram showing one specific hardware implementation that may be used in a logically partitioned computer system in accordance with the preferred embodiments.

FIG. 1 shows a sample computer system that shows some of the salient features of both hardware and software in accordance with the preferred embodiments. Now we present a more detailed implementation in FIGS. 2 and 3. FIG. 2 is a hardware diagram of a computer system that supports logical partitions and I/O resource allocation in accordance with the preferred embodiments. One physical enclosure 210 contains one or more CPUs 110 and memory 120 coupled together via system bus 160. A second enclosure 220 is an enclosure that houses I/O components coupled to a bus 212 that is coupled to system bus 160. We assume for this particular example that PCI components are the I/O components contained within enclosure 220. PCI host bridges 230 are coupled to bus 212, and provide an interface to multiple PCI to PCI bridges 240. In FIG. 2, there are two PCI host bridges 230A and 230B. PCI host bridge 230A provides an interface to four PCI to PCI bridges 240A-240D, while PCI host bridge 230B provides an interface to four PCI to PCI bridges 240E-240H. Each PCI to PCI bridge 240 connects to a single PCI adapter slot 250. Thus, PCI to PCI bridge 240A is coupled to a corresponding PCI adapter slot 250A; PCI to PCI bridge 240B is coupled to a corresponding PCI adapter slot 250B, and so on through PCI to PCI bridge 240H which is coupled to a corresponding PCI adapter slot 250H.

Each PCI host bridge 230 connects to the PCI to PCI bridges 240 via a primary PCI bus 260. FIG. 2 shows two primary PCI busses 260A and 260B. The PCI to PCI bridges 240 in turn connect to the PCI adapter slots 250 via a secondary PCI bus 270. FIG. 2 shows eight secondary PCI busses 270, namely 270A-270H that are coupled to their corresponding PCI adapter slots 250A-250H. PCI adapter slots 250 may be either connectors that receive a PCI adapter card, or PCI adapter chips embedded directly on the electronic substrate that contains the corresponding PCI to PCI bridge 240 or PCI host bridge 230. The logical partition operating systems "bind" CPU addresses to the PCI adapter memory for memory-mapped I/O from the CPU to the adapters, and bind memory addresses to the adapter, to enable the adapter to perform direct memory access (DMA) operations to and from the mapped memory addresses.

In the preferred embodiments, the presence of PCI to PCI bridges 240 between the PCI host bridge 230 and the PCI adapter slots 250 provide signaling and adapter binding isolation between the individual PCI adapters in the PCI adapter slots 250 and the PCI host bridge 230, CPUs 110 and memory 120. This isolation facilitates assignment of individual PCI adapter slots to different logical partitions, such that these partitions can share the platform hardware connected in common to the PCI to PCI bridges 240, but the operation of adapters assigned to other partitions does not disrupt the operation of an adapter assigned to a particular partition, and the adapter address bindings are enforced so that no partition or adapter can use another partition-adapter binding. Note that other methods of isolation that enable slot-level allocations and binding are within the scope of the preferred embodiments, such as associating each slot with a single PCI host bridge.

The power on/power off slot mechanism 124 shown in FIG. 1 preferably controls slot power control hardware in either each PCI host bridge 230 or in each PCI to PCI bridge 240. As discussed above with reference to FIG. 1, the power on/power off slot mechanism 124 can apply or remove electrical power to a particular slot 250 independent of the state of power to other I/O components of the platform, including other slots. In the most preferred embodiment, there is power on/power off control hardware in each PCI to PCI bridge 240 subject to power on/power of slot mechanism 124 that controls power to its corresponding slot 250. Thus, for the configuration shown in FIG. 2, PCI to PCI bridge 240A includes power on/power off hardware that controls power to slot 250A; PCI to PCI bridge 240B includes power on/power off hardware that controls power to slot 250B; and so on for each PCI to PCI bridge 240. Thus, for the system in FIG. 2, each of the PCI to PCI bridges 240A through 240H will have power on/power off hardware that controls power to their respective slots 250A-250H and that is controlled by power on/power off slot mechanism 124. Note that power on/power off hardware may not necessarily physically power down a slot. The preferred embodiments expressly extend to any method for placing a slot and its associated adapter in a power-on reset state. For example, some adapters may be embedded on a printed circuit board without components to individually control the power to the adapters. In this case, power on/power off hardware could place the adapter in a power-on reset state by flushing all of its data and placing the adapter in the same state as when it initially powers up, without physically cycling power to the adapter.

The configuration shown in FIG. 2 separates the platform electronics into one enclosure 210 containing the CPUs 110 and the memory 120, and the PCI I/O hardware components (e.g., 230, 240, 250, 260 and 270) into a separate enclosure 220. This is a common type of separation that is known in the art. Note, however, that in a small computer system it is common to have all elements in FIG. 2 contained in a single enclosure. In larger systems, there may be many CPUs and memory cards, and many PCI adapter slots requiring more PCI host bridges 230 and PCI to PCI bridges 240, so that the electronic packaging technologies require multiple electronic enclosures to contain these hardware elements. The preferred embodiments expressly extend to any suitable hardware configuration, whether all contained in a single enclosure or distributed among multiple enclosures.

In the preferred embodiments, it may be desirable to perform hardware service on components of the enclosure 220, such as power supplies, I/O slots, or other components of the enclosure that may require removing electrical power from all elements of that enclosure. In the preferred embodiments, this is accomplished by first transferring control of the I/O slots within that enclosure from their assigned logical partitions to the resource and partition manager, then powering off the enclosure and performing the hardware service, powering on the enclosure, and then transferring the I/O slots back to their assigned logical partitions. The I/O slot locks and related mechanisms for transferring the locks between logical partitions and the resource and partition manager facilitate this sequence of operations while the logical partitions continue operating. Note that the resource and partition manager may operate in conjunction with a hardware manager to perform these hardware management functions.

Figure 3:
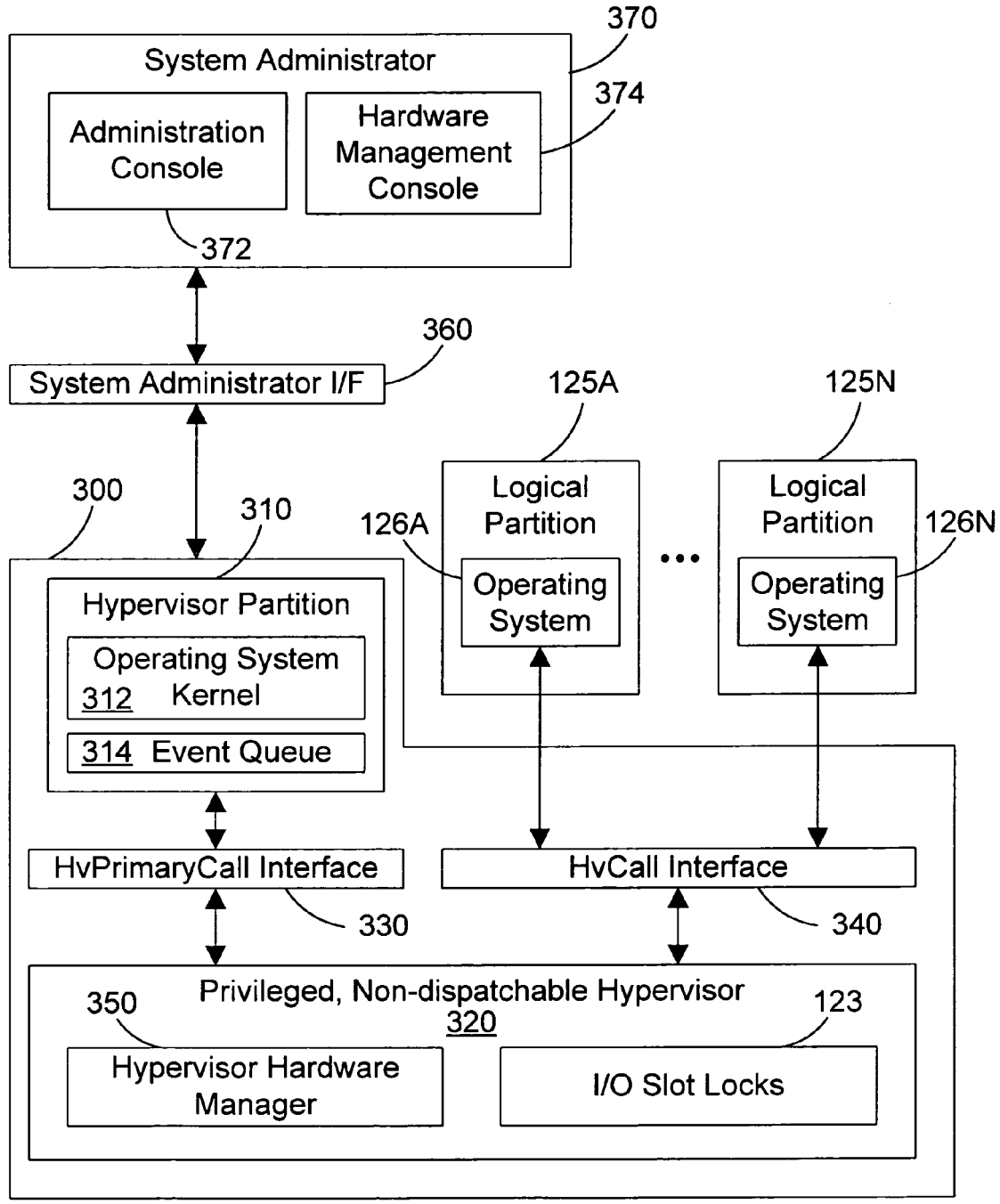
FIG. 3 is a block diagram of a specific logically partitioned software implementation that could be implemented on the hardware system shown in FIG. 2 in accordance with the preferred embodiments.

FIG. 3 is a block diagram showing specific software components that could implement the invention within the scope of the preferred embodiments. Note that the software components shown in FIG. 3 would preferably execute on a hardware platform such as computer system 200 shown in FIG. 2. N logical partitions 125A-125N are shown executing their respective operating systems 126A-126N. A hypervisor 300 is shown as one particular implementation of resource and partition manager 121 in FIG. 1. Hypervisor 300 includes a hypervisor partition 310 that runs an operating system kernel 312. The operating system kernel 312 is dispatchable and relocatable, and provides typical functions of operating system kernels, such as multitasking and memory management. The hypervisor partition 310 executes much as other logical partitions but differs from other logical partitions in that it is something of a private, or hidden, partition that does not provide for user applications and that has special authorities to control platform resources and is the only partition authorized to communicate with non-dispatchable hypervisor 320 via the HvPrimaryCall interface 330. The hypervisor partition 310 in FIG. 3 may correspond to a partition 125 in FIG. 1, which means the operating system kernel 312 also corresponds to an operating system 126 in FIG. 1. In current iSeries implementations, the hypervisor partition 310 could be called a "primary partition". The HvPrimaryCall interface 330 is used by the hypervisor partition 310 to invoke hypervisor functions performed with the processor in the privileged, non-dispatchable hypervisor mode.

The logical partitions communicate with the hypervisor via an HvCall interface 340, which is used by logical partitions to invoke privileged, non-dispatchable hypervisor 320. The non-dispatchable hypervisor 320 is a supervisory agent that is non-dispatchable and non-relocatable; it functions by accessing physical addresses. The non-dispatchable hypervisor 320 provides privilege mode functions that are invoked through any of: 1) the HvPrimaryCall interface 330 while the hypervisor Partition is scheduling or dispatching logical partition execution; 2) through platform hardware interrupts; and 3) from a logical partition using processor supervisory-call instructions defined by the HvCall interface 340 that place the logical partition execution thread into a hypervisor execution (i.e., privileged) mode.

The hypervisor hardware manager 350 and I/O slot locks 123 are preferably encapsulated functions within the non-dispatchable hypervisor 320, as shown in FIG. 3, but could be implemented in different locations as well. The hypervisor hardware manager 350 encapsulates the hypervisor functions to access and control the PCI host bridge 230 and PCI to PCI bridge 240 hardware in FIG. 2, and to track and enforce the hardware states of the PCI adapter slots 250. The slot locks 123 encapsulate the functions to set the ownership of the lock and to serialize transfer of a slot lock between the hypervisor and logical partitions.

The hypervisor partition 310 interacts with the non-dispatchable hypervisor 320 to effect slot state and slot lock transition. Hypervisor partition 310 is an agent of the system administrator interface 360, and performs logical partition configuration and platform service operations requested by the system administrator 370 through that interface. Note that system administrator 370 preferably includes an administration console 372 and a hardware management console 374.

In order for the non-dispatchable hypervisor 320 to initiate communications with functions in the hypervisor partition 310, the non-dispatchable hypervisor 320 enqueues messages to an event message queue 314 monitored by the hypervisor partition 310. In general, event messages from the non-dispatchable hypervisor 320 to the dispatchable hypervisor 310 are used to perform complex hardware control sequences, such as resetting and initializing bridge hardware, scanning virtual address translation tables, and performing real time delays associated with hardware settle times. Functions in the hypervisor partition 310 call the HvPrimaryCall interface 330 to signal completion of operations the non-dispatchable hypervisor 320 has requested, to synchronize these hardware states with the non-dispatchable hypervisor functions.

An I/O slot is typically assigned to a logical partition as part of configuring the platform resources to be used by the logical partition. However, at any given time, system administrator functions may initiate the transfer of an I/O slot from a logical partition using that slot to another logical partition, or to simply remove that slot from the logical partition's configuration, while the logical partition is active. Similarly, system service functions may require transfer of slot control from an active logical partition to the hypervisor or a service agent to perform a service function, such as servicing that slot individually or servicing other hardware within the same enclosure that cannot be performed without disruption to that or other slots in that enclosure.

The slot lock of the preferred embodiments facilitates dynamic transfer of control of an I/O slot between a logical partition operating system and the hypervisor, or between a controlled and an uncontrolled or unassigned state, without removing the I/O slot from the configuration database for the logical partition. The slot lock may be assigned to a logical partition, to the hypervisor, or may be unassigned to any entity (including logical partitions and hypervisor). The slot lock not only provides mutual exclusion between the hypervisor and logical partitions, it also provides a synchronization point to enforce power and reset state of a slot, and removing OS bindings between OS virtual address space and the adapter PCI memory or I/O spaces (memory mapped bindings) and between OS storage and adapter DMA mappings to that storage (e.g., indirect addresses in PCI memory space that translate to storage addresses in logical partition memory).

A logical partition operating system may use a function referred to herein as Vary Off to release control of a slot to the hypervisor or to an unassigned state, and may use a function referred to herein as Vary On to receive control of a slot from the hypervisor. The general concepts and methods of logical partition operating systems interacting with a hypervisor to vary off and vary on a PCI adapter slot have been implemented in the AS/400 and eServer (iSeries and pSeries) computer systems that provide logical partitioning. The preferred embodiments use the new feature of slot locks to control the Vary On and Vary Off processes, and to provide a synchronization point for the enforcement of slot power, reset, and operating system binding states. In addition, the preferred embodiments also provide an apparatus and method for preparing I/O slots for use and for transferring I/O slots between the hypervisor and logical partitions using a slot lock in relation to a logical partition Power On operation, a logical partition Power Off operation, and a logical partition Reboot operation.

Figure 4:
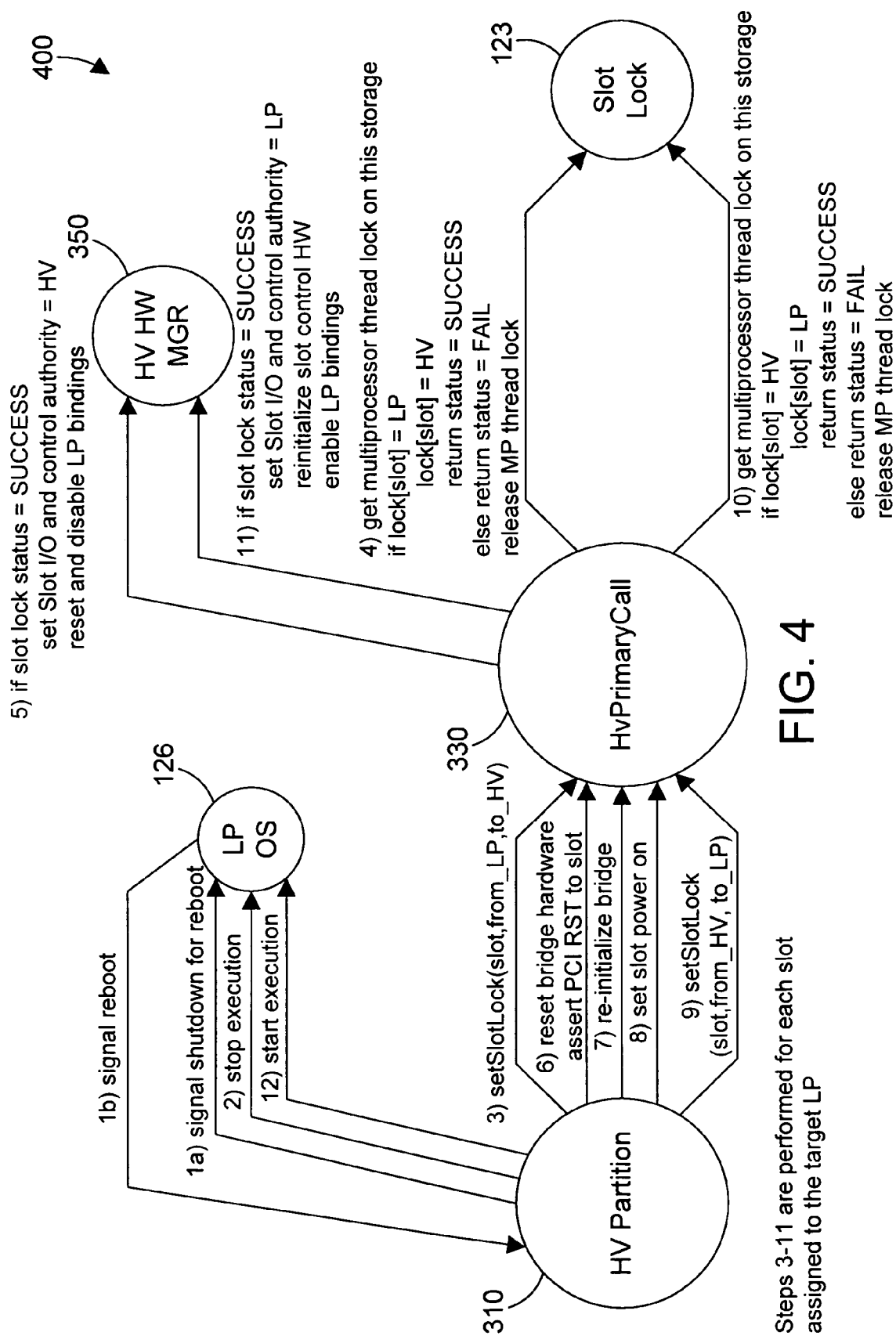
FIG. 4 is a flow diagram of a method for rebooting a logical partition in accordance with the preferred embodiments.

The function of the hypervisor 300 is shown in more detail in the flow diagrams of FIGS. 4-8. FIG. 4 shows a flow diagram of a method 400 for rebooting a logical partition. Note that the hypervisor 300 may decide to reboot a logical partition, or the logical partition itself may signal the hypervisor 300 that it is shutting down and should be rebooted. When the hypervisor 300 of FIG. 3 needs to reboot a logical partition, the hypervisor partition 310 signals a reboot to the operating system 126 in the logical partition (step 1a). Thus, if hypervisor 300 wants to reboot logical partition 125A in FIG. 3, the hypervisor (HV) partition 310 signals the logical partition operating system 126A to shutdown for reboot. The logical partition operating system 126A performs housekeeping chores to prepare its I/O adapters and to clean up for shutdown, and then signals the HV partition 310 to initiate reboot (step 1b). If the partition determines it needs to reboot, it performs its housekeeping chores to prepare its I/O adapters and to clean up for shutdown, and then signals the HV partition 310 to initiate reboot (step 1b) without the hypervisor requesting a reboot in step 1a. The HV partition 310 then stops the execution of the logical partition CPUs (step 2), terminating the logical partition operating system. In a normal shutdown, the LP OS 126 completes its housekeeping chores before shutting down. However, if the logical partition has crashed, it may be unable to complete any of the housekeeping chores before shutting down.

The HV partition 310 then calls the setSlotLock function (step 3) to the HvPrimaryCall interface 330. This transfers control of a slot that is currently under the control of the partition being rebooted to the hypervisor. Three parameters are passed with the setSlotLock call, namely: slot, from_LP, to_HV. The slot parameter specifies the slot of interest. The from_LP parameter specifies the logical partition that is being rebooted (which currently controls the slot), and the to_HV parameter specifies that the slot lock is being transferred to be controlled by the hypervisor 300. In executing the setSlotLock call, the hypervisor performs step 4, which gets a multiprocessor thread lock on the slot lock storage. In this specific implementation, this means that no other multiprocessor CPU threads can access any slot lock while the slot lock storage is locked. However, it is equally within the scope of the preferred embodiments to provide slot locks that may be individually locked instead of locking the entire slot lock storage. The status of the slot lock is then checked to see if it is currently owned by the logical partition being rebooted (if lock[slot]=LP). If the slot lock is owned by the logical partition being rebooted, ownership of the slot lock is transferred to the hypervisor (lock[slot]=HV), and the return status is set to SUCCESS. If the slot lock is not owned by the logical partition being rebooted, the return status is set to FAIL. The multiprocessor (MP) thread lock is then released on the slot lock storage. Next, the hypervisor interacts with the hypervisor hardware manager (HV HW MGR) 350 (step 5). If the slot lock status from step 4 is SUCCESS, the slot I/O and control authority are passed to the hypervisor, and the logical partition bindings to the slot are removed and disabled so that subsequent attempts by this or other logical partitions, or by the I/O adapter in the I/O slot, to establish or utilize such bindings will fail.

The HV partition 310 then calls the HvPrimaryCall interface 330 in steps 6-9. In step 6, a call is made to reset the PCI to PCI bridge for the slot, and to assert a reset signal PCI RST to the slot. In step 7, a call is made to re-initialize the PCI to PCI bridge. In step 8, a call is made to power on the slot. Note that step 8 could be omitted because the slot was reset in step 6, not powered down. Step 8 is typically performed after the hypervisor partition has performed reboot processing not related to I/O slots. In step 9, a setSlotLock call is made that specifies the slot of interest, that ownership is being transferred from the hypervisor (from_HV) to the logical partition (to_LP). Next, the hypervisor attempts to assign a slot lock to the logical partition being rebooted (step 10). First, a multiprocessor thread lock is achieved on the slot lock to prevent other threads from attempting to get the slot lock at the same time. If the slot lock is owned by the hypervisor, the slot lock is set to the logical partition being rebooted, and the status is set to SUCCESS. If the slot lock is not owned by that logical partition, the status is set to FAIL. The multiprocessor thread lock is then released. Next, in step 11, HvPrimaryCall 330 determines the status of the slot lock. If the slot lock status is SUCCESS, the hypervisor hardware manager 350 is invoked, setting slot I/O and control authority to the logical partition, reinitializing the slot control hardware, and enabling the logical partition bindings to the slot.

Note that steps 3-11 are performed for each slot assigned to the logical partition. Once steps 3-11 have been performed for all I/O slots, execution of the logical partition operating system 126 may commence (step 12). In the preferred embodiments, some of these steps may be serialized while others may be performed in parallel for different slots. For example, slots may be transferred to the hypervisor one at a time. All slots may then be reset and initialized with lots of parallelism. Once partition reboot processing is done, slots are powered on with lots of parallelism. Finally, the slots are allocated back to the partition one at a time.

Figure 5:
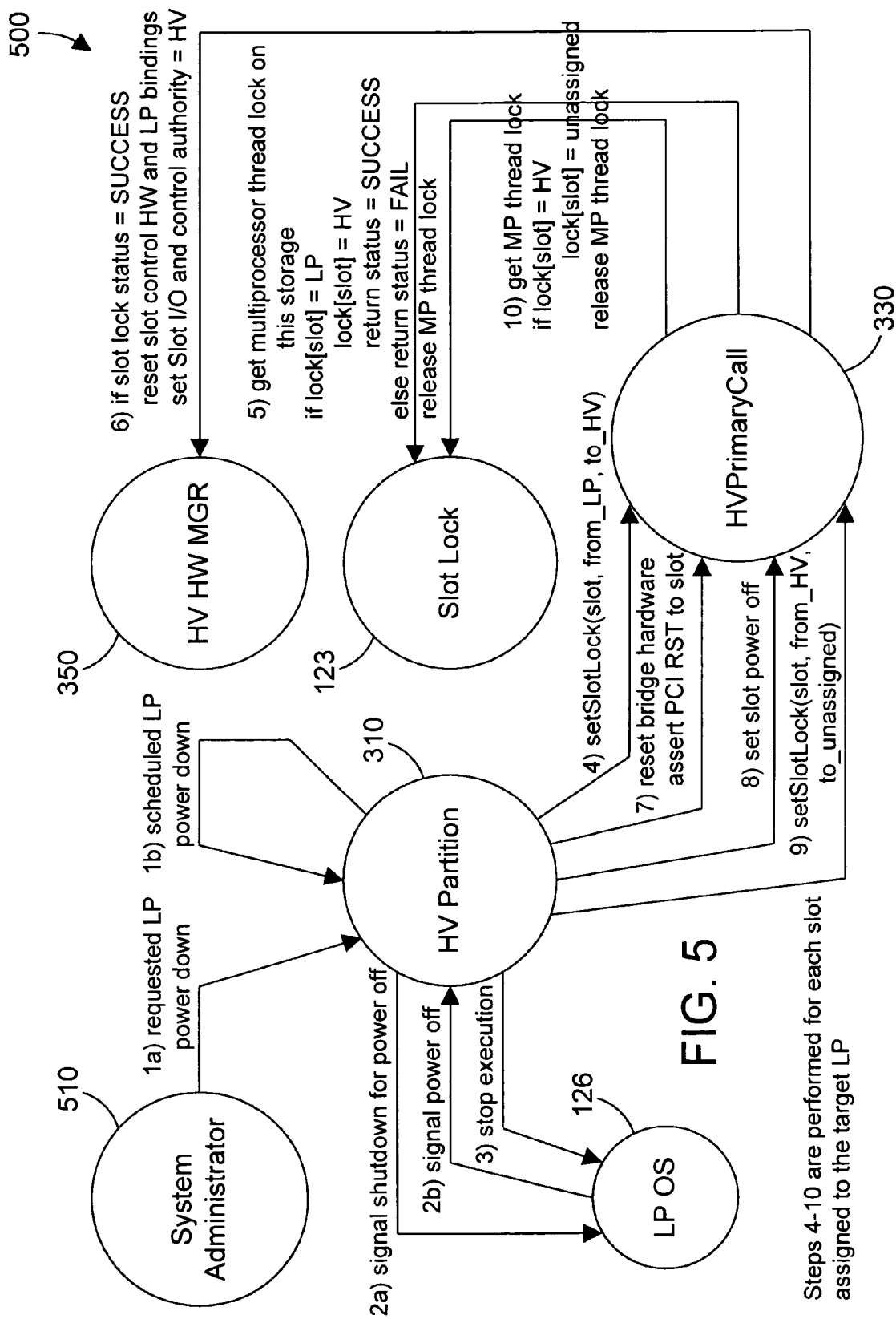
FIG. 5 is a flow diagram of a method for shutting down a logical partition in accordance with the preferred embodiments.

FIG. 5 shows a method 500 for powering off a logical partition within the scope of the preferred embodiments. Powering off a logical partition may occur in response to a request from a system administrator 510 (step 1a), or in response to a scheduled power down (step 1b). The logical partition operating system 126 is signaled to power down (step 2a) followed by a signal to the hypervisor when the logical partition is prepared (step 2b). As in the case of reboot, the logical partition performs housekeeping and I/O adapter preparation prior to signaling the hypervisor it is ready to be shutdown. Following step 2b, the hypervisor then stops the execution of the logical partition CPUs (step 3), terminating the logical partition operating system to establish its logically powered off state. The setSlotLock function is then invoked on the HvPrimaryCall interface 330 (step 4), specifying three parameters: slot, which specifies the slot of interest; from_LP, which specifies the logical partition that the slot lock ownership is being transferred from; and to_HV, which specifies that the slot lock ownership is being transferred to the hypervisor. In response, the HVPrimaryCall interface 330 interacts with the slot lock 123 as shown in step 5. First, it gets a multiprocessor thread lock on the slot lock. If the slot lock is currently owned by the logical partition being powered down (lock[slot]=LP), the slot lock is reassigned to the hypervisor (lock[slot]=HV), and the return status is set to SUCCESS. If the slot lock is not currently owned by the logical partition being powered down, the return status is set to FAIL. After the return status is set to its appropriate value, the multiprocessor thread lock is released.

If the slot lock status is SUCCESS, hypervisor hardware manager 350 is next invoked in step 6. The slot control hardware and logical partition bindings to the slot are reset, and the slot I/O and control authority are transferred to the hypervisor. Once step 6 is complete, step 7 resets the bridge hardware for the slot and asserts the reset signal PCI RST to the slot, and step 8 sets the slot power off. Step 9 is a call to transfer the slot lock from the hypervisor to make the slot lock unassigned, which is implemented in step 10. Note that steps 4-10 are performed for each slot assigned to the logical partition being powered down.

Figure 6:
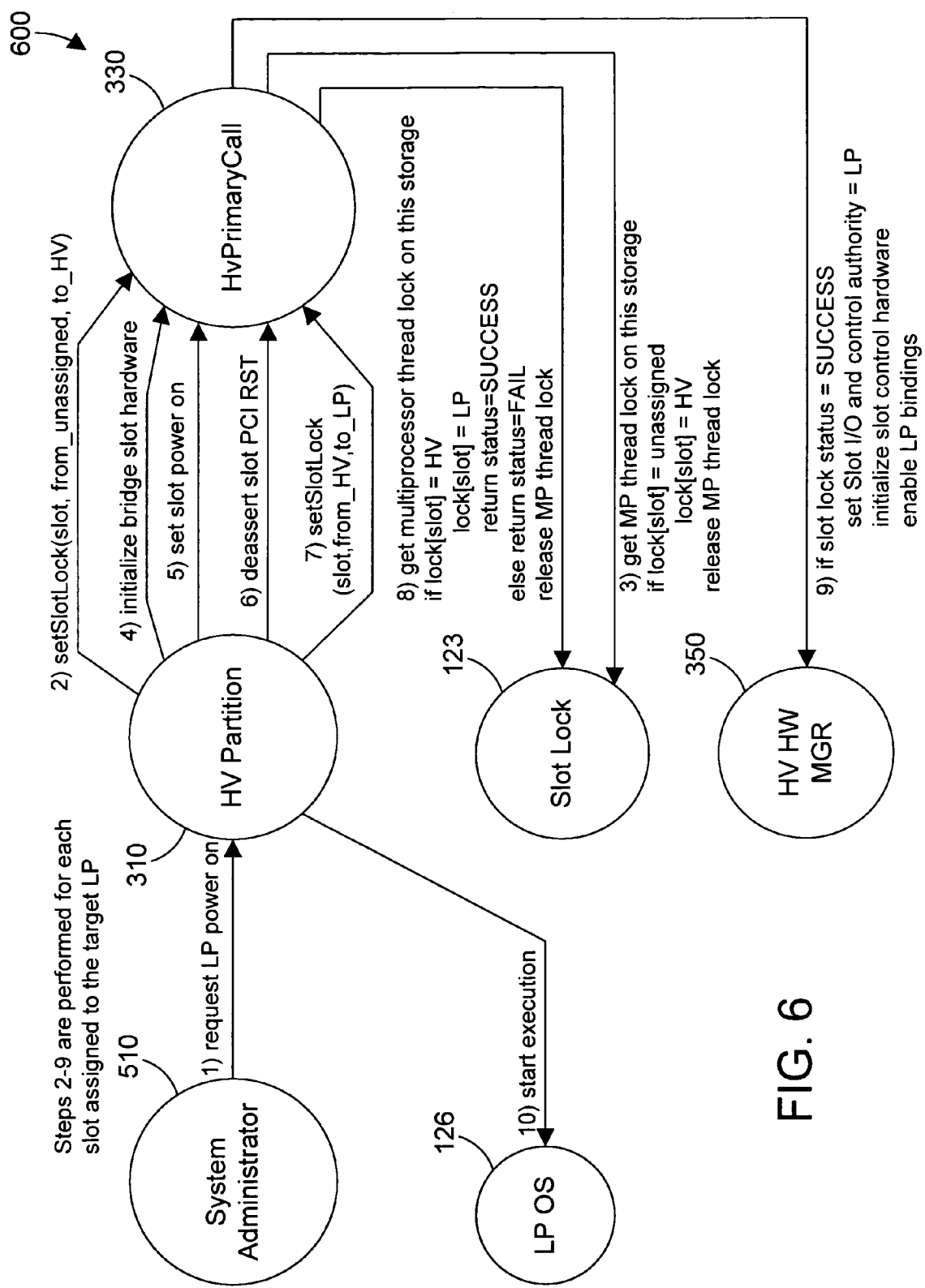
FIG. 6 is a flow diagram of a method for powering up a logical partition in accordance with the preferred embodiments.

FIG. 6 shows a method 600 for powering on a logical partition in accordance with the preferred embodiments. The process begins when a system administrator 510 requests that a logical partition be powered on (step 1). Logical partition power on may also be a scheduled task of the HV partition 310. The HV Partition 310 issues a setSlotLock call to transfer the slot from unassigned to the hypervisor (step 2). In response, step 3 is performed, which gets a multiprocessor thread lock, and if the slot lock is unassigned, it assigns the slot lock to the hypervisor. Only if the slot lock is successfully transferred to the hypervisor in step 3 are the remaining steps in FIG. 6 performed.

Bridge slot hardware for a selected slot is initialized (step 4), and the slot is then powered on (step 5). The slot reset signal PCI RST is then deasserted (step 6), which takes the slot out of its reset state and allows it to function. A setSlotLock call is then made (step 7) that specifies the slot of interest (slot), that the slot lock of interest currently belongs to the hypervisor (from_HV), and that ownership of the slot lock of interest is to be transferred to the logical partition being powered up (to_LP).

Next, step 8 is performed, which gets a multiprocessor thread lock on the slot lock, determines if the slot lock is currently owned by the hypervisor, and if so, allocates the slot lock to the logical partition. The return status is then set to SUCCESS. If the slot lock is already owned by a different partition, the return status is set to FAIL. Once the return status is set to its appropriate value, the multiprocessor thread lock is released.

Step 9 is then performed, which checks the slot lock status, and if it indicates SUCCESS, the slot I/O and control authority are set to the logical partition, the slot control hardware is initialized, and the bindings from the slot to the logical partition are enabled. Note that steps 2-9 are performed for each slot assigned to the target logical partition being powered up. Once steps 2-9 have been performed for each slot assigned to the target logical partition, the execution of the logical partition operating system 126 is started (step 10).

Figure 7:
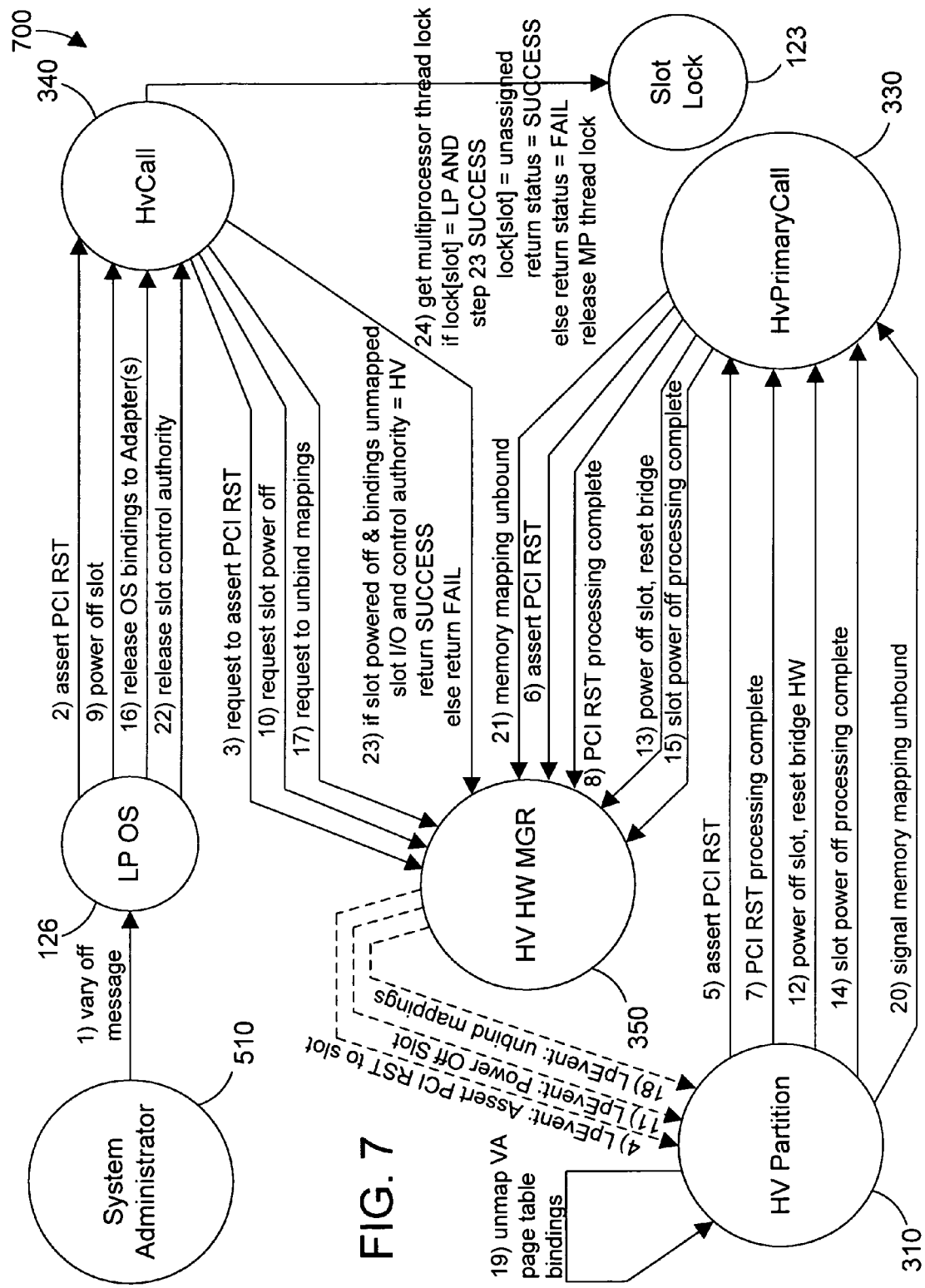
FIG. 7 is a flow diagram of a method for a logical partition to relinquish control of a slot it owns in accordance with the preferred embodiments.
Figure 8:
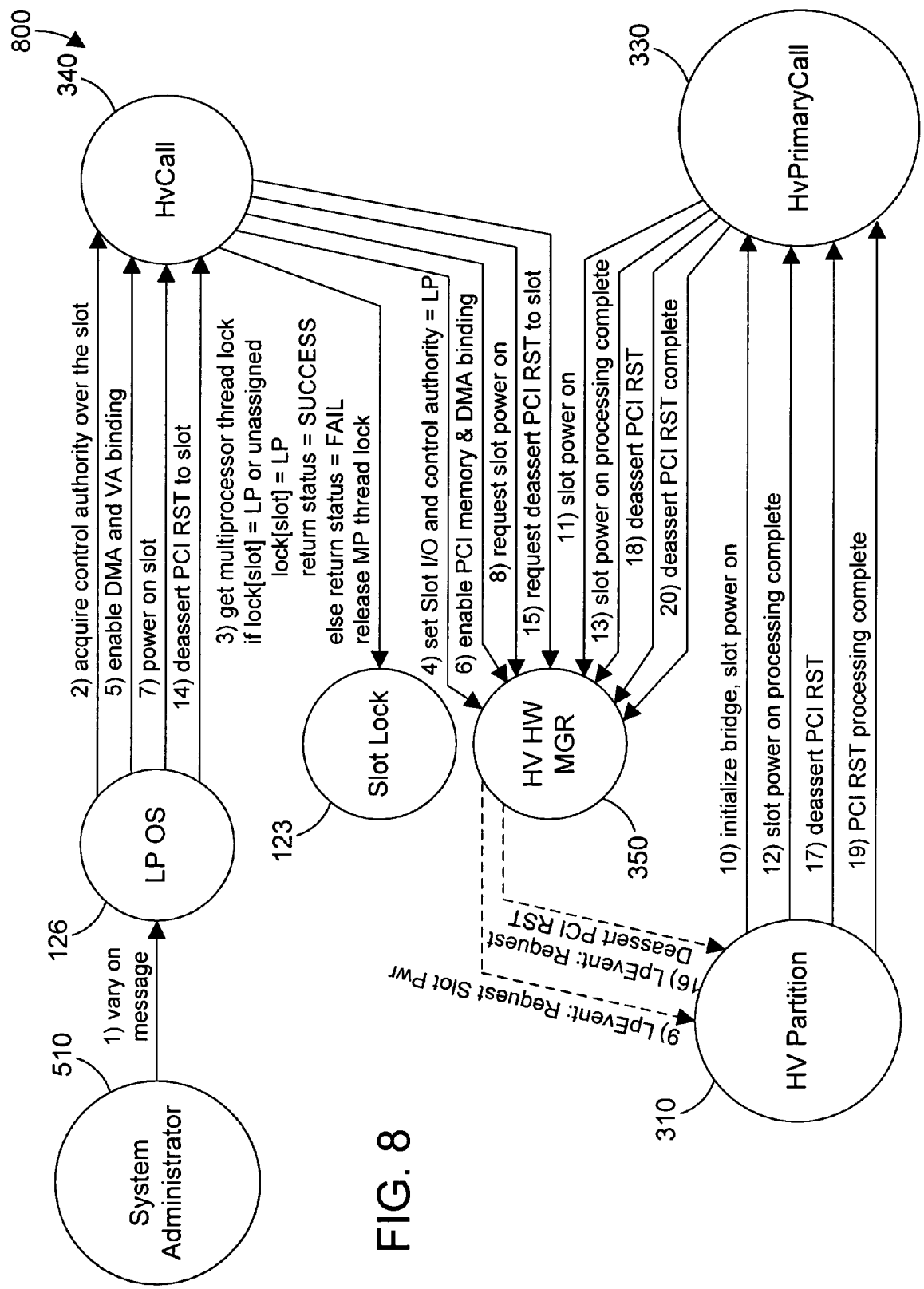
FIG. 8 is a flow diagram of a method for a logical partition to regain control of a slot it owns in accordance with the preferred embodiments.

As described above, there are times when control of an I/O slot may be transferred from one logical partition to another without powering off or rebooting either partition. Similarly, there are times when control of an I/O slot may be transferred from a logical partition to the hypervisor for maintenance, also without powering off or rebooting that logical partition. The function "Vary Off" allows an active partition to dynamically relinquish control of a slot without relinquishing ownership of the slot in the platform partition configuration database. In similar fashion, the function "Vary On" allows an active partition to dynamically acquire control of a slot that it owns according to the platform partition configuration database. FIGS. 7 and 8 show the detailed flow diagrams for the vary off and vary on functions, respectively.

Referring now to FIG. 7, a method 700 for implementing the vary off function in accordance with the preferred embodiments begins when a system administrator 510 or other system manager (such as a workload manager application) sends a vary off message to a logical partition operating system 126 (step 1). In return, the logical partition operating system calls the HvCall interface 340 to assert the slot reset signal PCI RST to the slot (step 2). The hypervisor hardware manager 350 is then invoked to assert the PCI RST signal (step 3). In response, the hypervisor hardware manager 350 places a message on an event queue that allows the non-dispatchable hypervisor to communicate with the hypervisor partition (step 4). The HV Partition 310 monitors the event queue for messages, and when it sees the queued message in step 4, it calls the HvPrimaryCall interface 330 to assert the PCI RST signal (step 5). The hypervisor hardware manager 350 is then invoked to assert the PCI RST signal (step 6). HV Partition 310 delays for some period of time to allow the state of the hardware to settle. After waiting the appropriate delay, the HV Partition 310 then signals that non-dispatchable hypervisor that PCI RST processing is complete (step 7). The completion of PCI RST processing is then signaled to the hypervisor hardware manager (step 8).

Next, the logical partition operating system 126 calls the HvPrimaryCall interface 330 to request power off of the slot (step 9). This invokes the hypervisor hardware manager (step 10), which generates a power off slot event in the event queue to the HV Partition 310 (step 11). Once the HV Partition 310 sees the logical partition event "power off slot" on the event queue in step 11, it invokes the HvPrimaryCall interface 330 to power off the slot and reset the bridge hardware (step 12). This is then passed to the hypervisor hardware manager (step 13). The HV Partition 310 again waits a predetermined delay to allow the hardware to settle, then calls the HvPrimaryCall interface 330 to signal the non-dispatchable hypervisor that slot power off processing is complete (step 14). This is then relayed to the hypervisor hardware manager (step 15). In this detailed implementation, the PCI RST signal is first asserted to reset the secondary bus under the PCI to PCI bridge corresponding to a slot, and then the bridge itself is reset, which isolated everything under the bridge. At this point, the slot is powered down.

The LP OS 126 also calls to the HvCall interface 340 to release the OS bindings to the adapters (step 16). In response, the HvCall interface 340 calls the hypervisor hardware manager 350 to unbind the adapter mappings (step 17). An event message is then queued on the event queue to unbind the mappings for the slot (step 18). The HV Partition 310 then unmaps the page table and DMA bindings for the adapter in this slot (step 19). The HV Partition 310 then signals that the memory mappings have been unbound (step 20). The HvPrimaryCall 330 relays this to the hypervisor hardware manager (step 21).

The LP OS 126 calls to the HvCall interface 340 to release control authority for the slot (step 22). In response, step 23 is performed. If the slot is powered off and the bindings are unmapped, the slot I/O and control authority is set to the hypervisor, and SUCCESS is returned. Otherwise, FAIL is returned. Then step 24 is performed. First, a multiprocessor thread lock is obtained. If the slot lock is currently owned by the logical partition (lock[slot]=LP) and step 23 indicated SUCCESS, the slot lock ownership is relinquished (lock[slot] =unassigned) and return status is set to SUCCESS. Otherwise, return status is set to FAIL. The multiprocessor thread lock is then released. The System Administrator 510 or other agent that requested the vary off function in step 1 will then use the status returned from the sequence of steps 1 through 23 to determine whether the vary off function was successful. At this point the slot has been relinquished and can now be transferred to a different partition or taken over by a hardware service tool.

Method 800 of FIG. 8 shows steps performed in implementing the vary on message within the scope of the preferred embodiments. First, a system administrator or other system manager sends a vary on message to the logical partition operating system 126 (step 1). Next, the LP OS 126 calls the HvCall interface 340 to acquire control authority over the slot (step 2). In response, step 3 is performed, which gets a multiprocessor thread lock on the slot lock. If the slot lock is currently owned by the requesting partition or is unassigned, the slot lock is assigned to the logical partition, and the return status is set to SUCCESS. If the slot lock is not owned by this logical partition, the return status is set to FAIL. The multiprocessor thread lock is then released.

Assuming the status is SUCCESS for step 3, steps 4-20 may be performed. In step 4, slot I/O and control authority for the slot is set to the logical partition (step 4). The LP OS 126 calls the HvCall interface 340 to enable DMA and virtual address (VA) binding (step 5). This calls the hypervisor hardware manager (step 6). In response, the hypervisor hardware manager 350 enables the DMA and VA bindings for the adapter in the slot. The LP OS 126 also calls the HvCall interface 340 to power on the slot (step 7). This invokes the hypervisor hardware manager (step 8). In response, an event is placed on the event queue that requests that the slot be powered on (step 9). In response, the HV Partition 310 calls the HvPrimaryCall interface 330 to initialize the bridge and to power on the slot (step 10). This invokes the hypervisor hardware manager (step 11). After waiting an appropriate delay to assure the slot is powered on and stable, a message is sent indicating that power on processing is complete (step 12). The completion of power on processing is then signaled to the hypervisor hardware manager (step 13).

The LP OS 126 calls the HvCall interface 340 to deassert the PCI RST signal to the slot (step 14). This invokes the hypervisor hardware manager (step 15). In response, an event message is written to the event queue requesting that the PCI RST signal be deasserted (step 16). An HvPrimaryCall is then made to deassert the PCI RST signal (step 17), which is passed to the hypervisor hardware manager (step 18). In response, the non-dispatchable hypervisor deasserts the PCI RST signal to the slot. After waiting an appropriate delay to assure the slot is out of reset and stable, a the HV partition 310 calls the HvPrimaryCall interface 330 to indicate that PCI RST processing is complete (step 19). The completion of PCI RST processing is also communicated to the hypervisor hardware manager (step 20). At this point the logical partition has acquired control of the slot and can resume operations using the slot.

The preferred embodiments provide a significant advance over the prior art by providing slot locks that must be obtained before operations on the slot may be performed, and by assuring that a slot is powered off and then on again before control of that slot can be transferred between entities. A slot may be controlled by a logical partition, by the hypervisor, or may be unassigned. Note that various agents under control of the hypervisor, such as hardware managers, may control slots as well. The mutually exclusive slot locks assure non-conflicting access to slots by competing entities. Powering down a slot when it is removed from a logical partition eliminates the issue of data integrity for data in an adapter and assures the adapter is always in a power-on reset state when it is allocated to a logical partition.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, while PCI slots are shown as an example of a specific type of resource that may be independently controlled, other types of resources besides PCI slots could also be controlled within the scope of the preferred embodiments. For example, various different types of I/O slots or adapters, such as PCMCIA slots, S390 channel or control units, etc. could be controlled using the teachings of the preferred embodiments. Other types of like resources that could be controlled in accordance with the preferred embodiments include I/O buses, I/O communication channels (such as Infiniband queue pairs), virtual slots or devices, CPUs, and memory blocks.

What is claimed is:

1. A computer-implemented method for managing a plurality of PCI adapter slots in a computer system that includes a plurality of logical partitions, the method comprising the steps of:

defining a plurality of PCI adapter slot locks, wherein each of the plurality of PCI adapter slots has a corresponding PCI adapter slot lock;

controlling access to each PCI adapter slot by the plurality of logical partitions by requiring exclusive ownership of the corresponding PCI adapter slot lock before transferring control of the corresponding PCI adapter slot to one of the plurality of logical partitions;

unbinding all memory and virtual address bindings and preventing the establishment of new bindings to an adapter in a selected PCI adapter slot when control of the selected PCI adapter slot is removed from one of the plurality of logical partitions if the memory and virtual address bindings have not been previously unbound;

transferring control of the selected PCI adapter slot to a resource and partition manager when control of the selected PCI adapter slot is removed from one of the plurality of logical partitions;

transferring control of a selected PCI adapter slot to one of the plurality of logical partitions when control of the selected PCI adapter slot is transferred to the one logical partition;

enabling memory and virtual address bindings to the adapter in the selected PCI adapter slot when control of the selected PCI adapter slot is transferred to one of the plurality of logical partitions;

one of the plurality of logical partitions relinquishing control of a PCI adapter slot that the one logical partition owns without relinquishing ownership of the PCI adapter slot; and the one logical partition regaining control of the PCI adapter slot that the logical partition owns but for which the one logical partition previously relinquished control.

* * * * *